W. STARLING.
Sulky-Plows.

No. 154,293.  Patented Aug. 18, 1874.

Witnesses:
Chas. Nida
Sedgwick

Inventor:
W. Starling
Per
Attorneys.

UNITED STATES PATENT OFFICE.

WILLIAM STARLING, OF LA PRAIRIE, ILLINOIS.

IMPROVEMENT IN SULKY-PLOWS.

Specification forming part of Letters Patent No. 154,293, dated August 18, 1874; application filed March 14, 1874.

*To all whom it may concern:*

Figure 1:
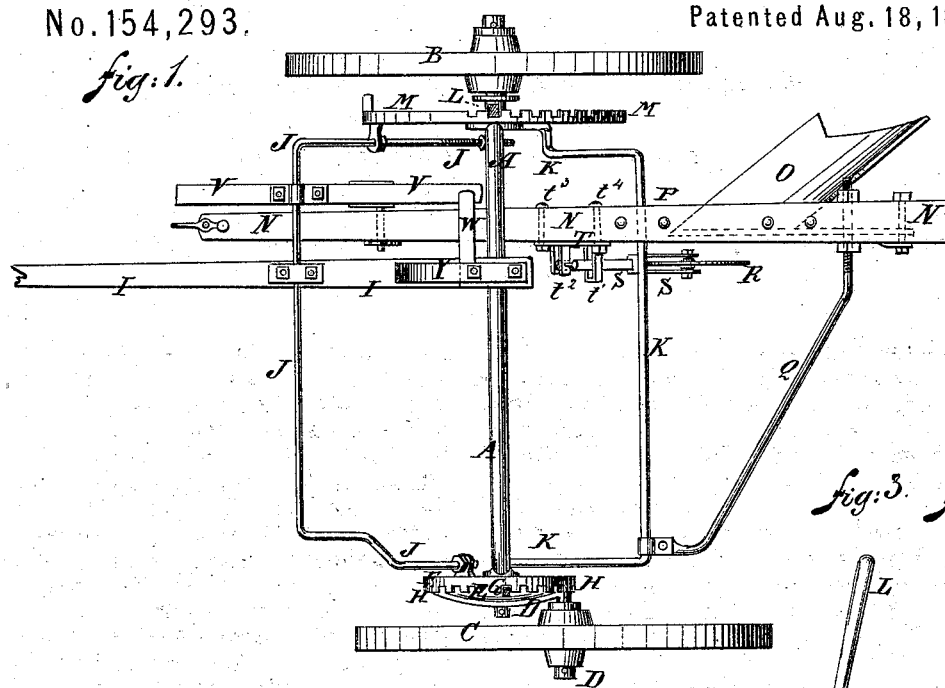
Figures 3, 4:
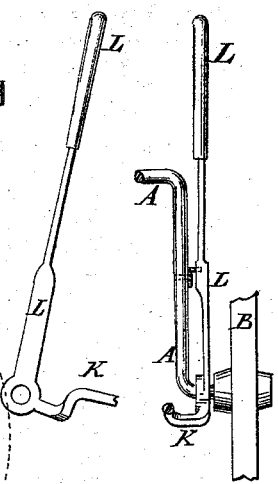
Figure 2:
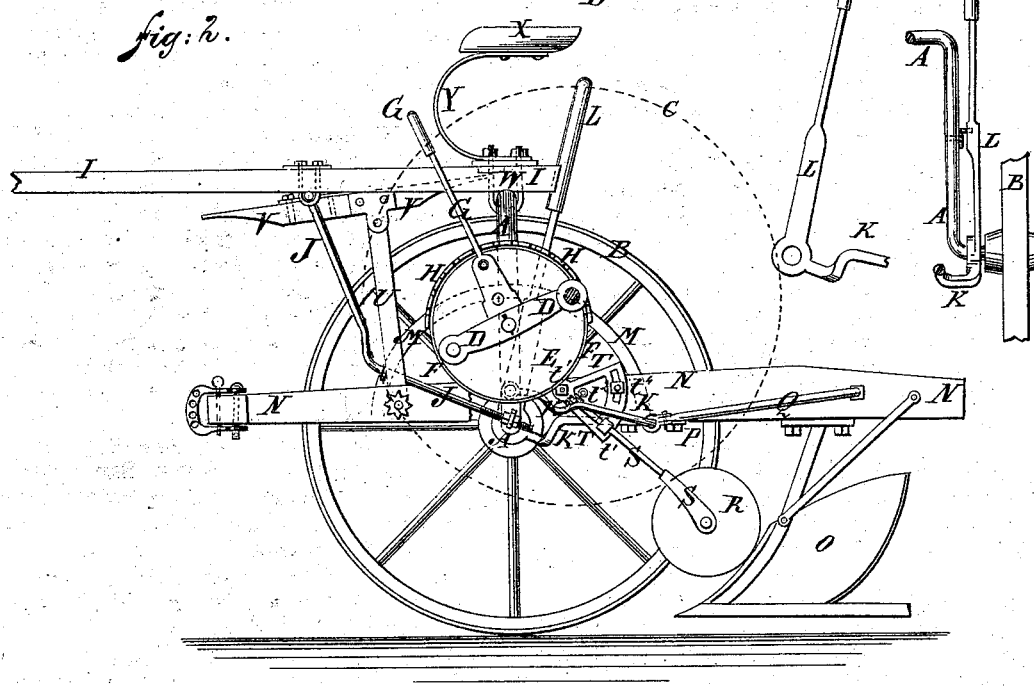

Be it known that I, WILLIAM STARLING, of La Prairie, in the county of Marshall and State of Illinois, have invented a new and useful Improvement in Sulky-Plow, of which the following is a specification:

Figure 1 is a top view of my improved plow. Fig. 2 is a side view of the same, the land-side wheel being removed. Fig. 3 is a detail side view of the lever for raising and lowering the plow. Fig. 4 is a rear view of the same, showing its connection with the axle and crank-bar.

Similar letters of reference indicate corresponding parts.

The invention will first be fully described, and then pointed out in the claims.

A is the axle, the middle part of which is horizontal, and the end parts of which are bent downward at right angles. One of the ends of the axle A is bent outward at right angles, and has a journal formed upon it to receive the wheel B. The other wheel, C, revolves upon the journal of the crank-axle D, the inner arm of which is bolted or riveted to a plate, E, eccentrically. The plate E is pivoted at its center by a strong bolt to the center of the plate F, and is moved to adjust the wheel C, to keep the machine level while the wheel B runs upon the surface of the ground, or in a furrow of a greater or less depth, by a spring-lever, G, riveted or bolted to said plate E, and which is held in any position into which it may be adjusted by entering one or the other of the notches in the outwardly-projecting flange H, formed upon or attached to the upper part of the plate F. The plate F is rigidly riveted or bolted to the end of the axle A. I is the tongue, which is secured by staples and nuts to the upper part of the axle A, and of the brace J, so that by loosening the said nuts the tongue I may be adjusted as required, for the attachment of two or three horses. When two horses are used, the tongue should be directly over the plows. The middle part of the brace J is horizontal, and its end parts are bent downward at right angles, are inclined to the rearward, and have screw-threads cut upon them to receive the nuts by which said ends are adjustably secured to eyes, one of which is attached to the axle A at the inner end of the journal of the wheel B. The other eye is attached to the plate F, or the ends of said brace J may be bolted or riveted to the axle A and plate F. By this construction the brace J may be raised and lowered by moving the nuts upon its ends to adjust the tongue I, as may be required. K is a bar, which is bent twice at right angles, to bring its middle part into horizontal position. One end of the crank-bar K rides upon the inner end of the journal of the wheel B, and its other end rides upon a bolt or pin attached to the plate F. The end parts of the bar K are bent so that its movements may not be interfered with by the other mechanism of the machine. With the end of the crank-bar K is rigidly connected the lower end of a spring-lever, L, which projects upward along a curved bar, M, attached to the axle A and brace J, and in the outer side of the rear part and in the extreme forward part of which are formed notches to receive the lever L, and hold it in any position into which it may be adjusted. N represents an ordinary plow-beam to which an ordinary plow, O, is attached. To the under side of the plow-beam N is bolted a box, P, to receive the horizontal part of the crank-bar K, one of said bolt-holes being elongated laterally, to enable the plow to be adjusted to take more or less land. By loosening the bolts of the box P the plow may be adjusted to cut a wider or narrower furrow, as may be desired. The plow N O is further secured in place by the inclined brace Q, the forward end of which is pivoted to the crank-rod K. The rear end of the brace Q has a screw-thread cut upon it, passes through the rear part of the plow-beam N, and has two nuts screwed upon it, one upon each side of the said beam, so that by adjusting the said nuts the plow-beam may be adjusted, as required. R is a rotary cutter, which is pivoted in the slotted or forked lower end of the bar or standard S, which passes through a long keeper, $t^1$, and is pivoted to an open keeper, $t^2$, attached to the quadrant T, which is pivoted at its angle to the plow-beam by a bolt, $t^3$, and is further secured in place by a bolt, $t^4$, which passes through a curved slot in the curved arm of the quadrant T, so that by loosening the said bolt $t^4$ the cutter may be adjusted to work deeper or shallower in the ground, as may be desired. Several holes are formed in the upper end of the bar S and in the open keeper $t^2$, to receive the pivoting-pin, so that the cutter may be conveniently adjusted as the adjustment of the plow may require. To the side of the forward part of the plow-beam N is pivoted the lower end of the bar U, the upper end of which is jointed to the foot-lever V, which is pivoted to the brace J, and the rear end of which, when raised, strikes against a stop, W, attached to the rear part of the tongue I. The jointed lever U V enables the driver, with his foot, to hold or lock the forward end of the plow-beam down or to raise it, as may be desired. X is the driver's seat, which is secured to the upper end of the spring-standard Y, the lower end of which is secured to the rear part of the tongue I.

Having thus described my invention, I claim as new, and desire to secure by Letters Patent—

1. The crank-bar K, combined with the plow-beam N, lever L, and axle A, as and for the purpose set forth, so that the horses are made to raise the plow out of the ground.

2. The combination of the jointed lever U V and stop W, with the brace J, tongue I, and plow-beam N, substantially as herein shown and described.

3. The quadrant T, provided with the long keeper $t^1$, the open keeper $t^2$, and the two bolts $t^3$ $t^4$, in combination with the standard S of a rotary cutter, for connecting said cutter adjustably to a plow-beam, substantially as herein shown and described.

WILLIAM STARLING.

Witnesses:
  HENRY ROBINSON,
  WM. WOOLLEY.